Jan. 20, 1970   A. K. BRENNAN, JR   3,490,750
HIGH INTENSITY MIXING MACHINE
Filed Dec. 18, 1967   5 Sheets-Sheet 1
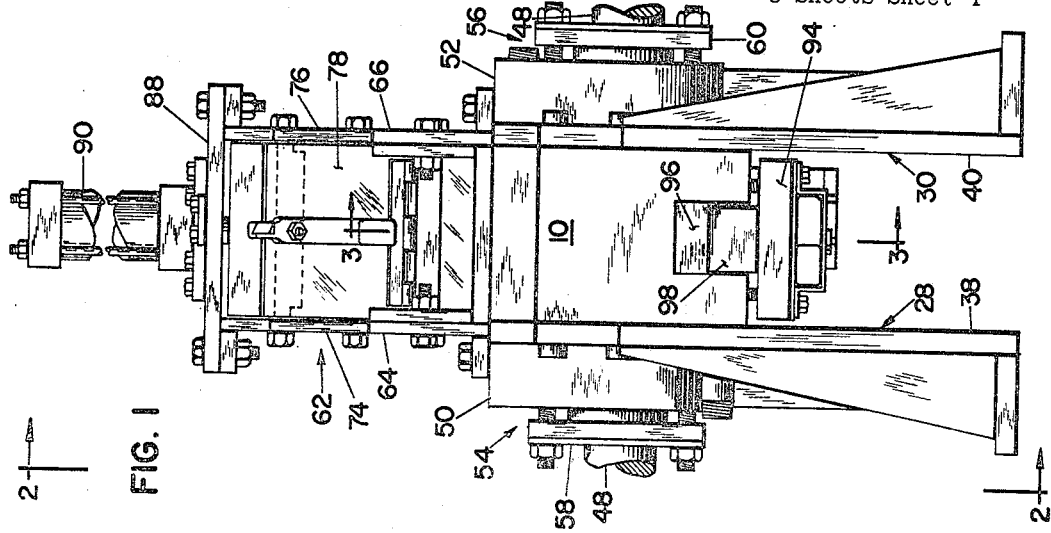
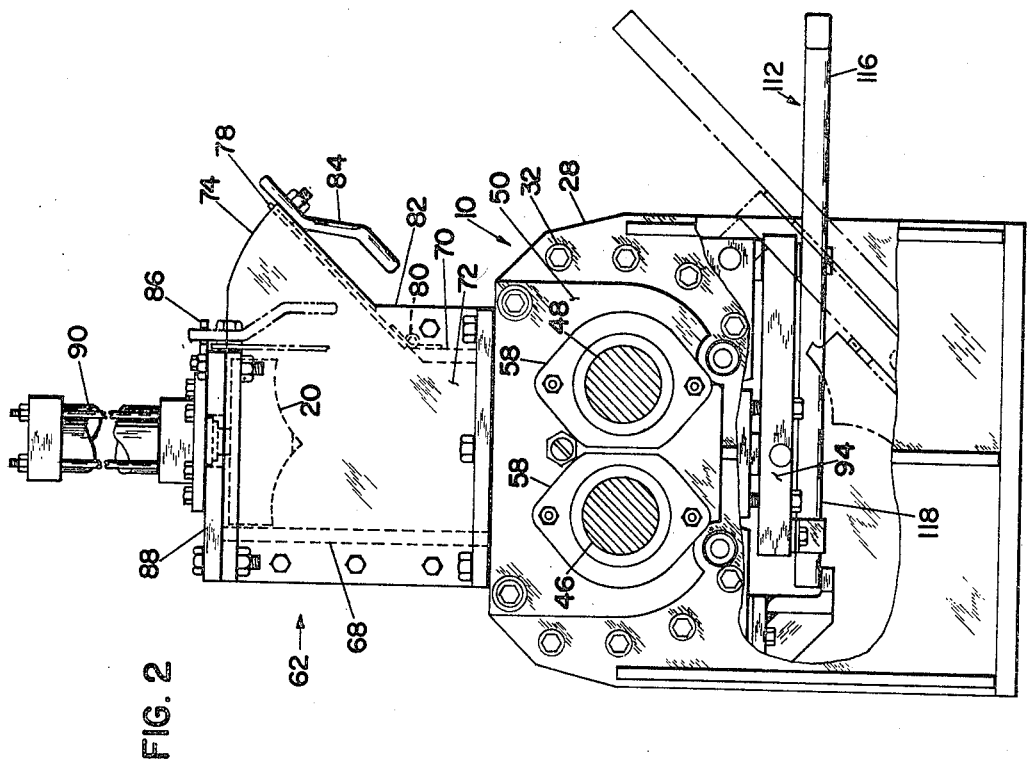
INVENTOR.
A. KIRK BRENNAN JR.
BY
Otto Moeller

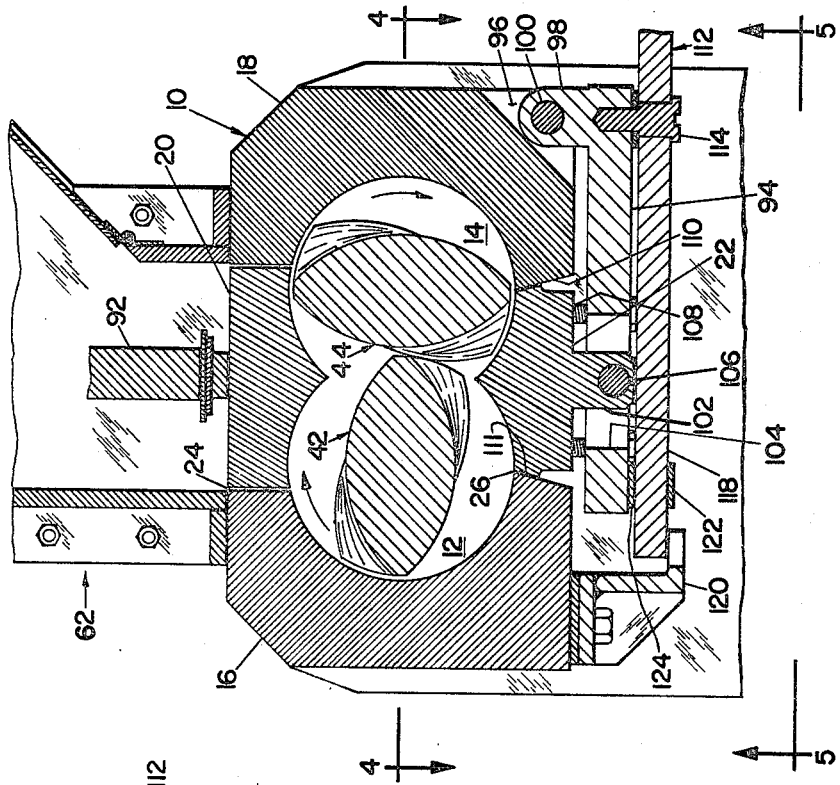

Jan. 20, 1970  A. K. BRENNAN, JR  3,490,750
HIGH INTENSITY MIXING MACHINE
Filed Dec. 18, 1967

INVENTOR.
A. KIRK BRENNAN JR.
BY

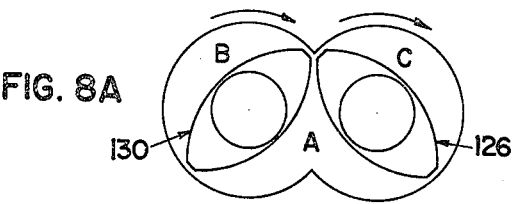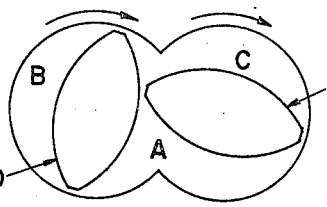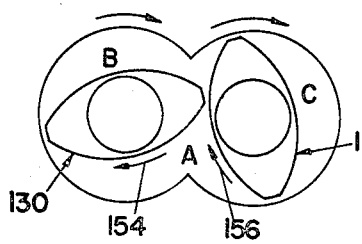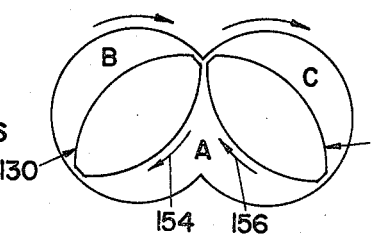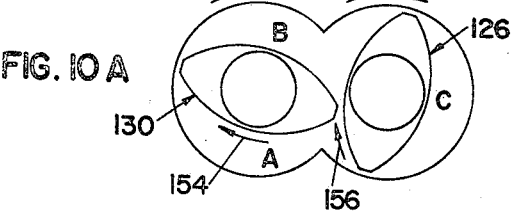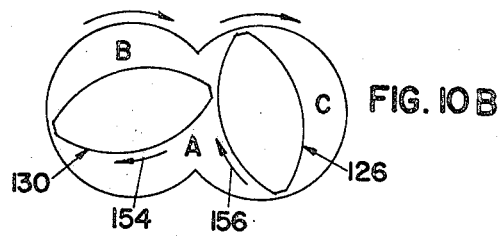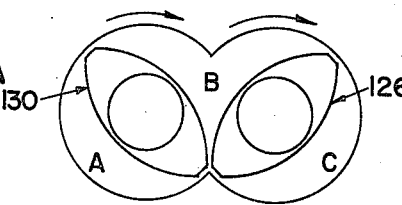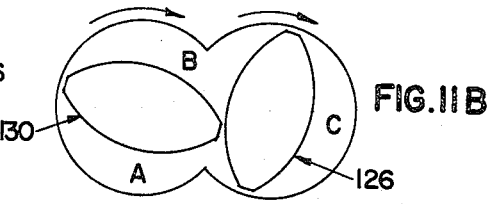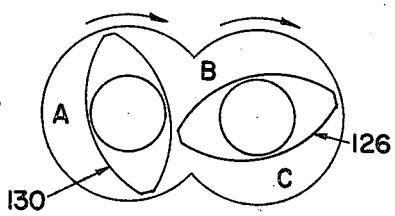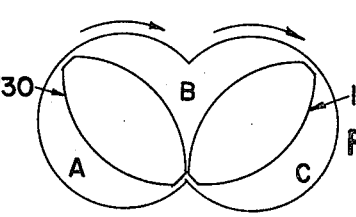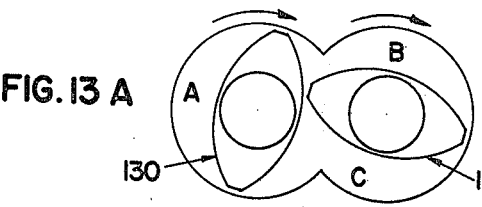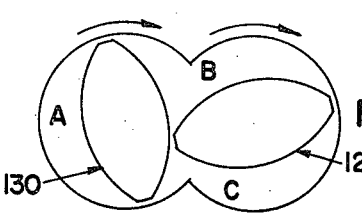

Jan. 20, 1970 A. K. BRENNAN, JR 3,490,750
HIGH INTENSITY MIXING MACHINE
Filed Dec. 18, 1967 5 Sheets-Sheet 5

INVENTOR.
A. KIRK BRENNAN JR.
BY
Otto Moeller

United States Patent Office 3,490,750
Patented Jan. 20, 1970

1

3,490,750
HIGH INTENSITY MIXING MACHINE
Ambrose Kirk Brennan, Jr., Thomasville, Pa., assignors, by mesne assignments, to Teledyne, Inc., Los Angeles, Calif., a corporation of Delaware
Filed Dec. 18, 1967, Ser. No. 691,594
Int. Cl. B01f 7/06; B29b 1/10
U.S. Cl. 259—104    10 Claims

ABSTRACT OF THE DISCLOSURE

A mixing apparatus for highly viscous substances having a housing in the form of parallel intersecting cylinders and a pair of similar interengaging lenticularly shaped rotors mounted to rotate 90° out of phase and about axes extending axially of the cylinders in the same direction and at the same speed forming as they rotate pockets varying in volume with respect to each other. The rotors provide between their major diameter extremities and the housing and between the major diameter extremities of a rotor and the adjacent flank of a mating rotor restricted clearances. Each rotor is formed with longitudinally adjacent sections twisted on helixes of opposite hand and having a displacement angle less than 90° and twisted in a direction from the ends to the midpoint of the rotors opposite the direction of rotation of the rotors, for movement of the material in a generally longitudinal direction away from the ends of the housing and for squeezing of material with intense shear through the clearance from a pocket of decreasing volume to a pocket of increasing volume.

BACKGROUND OF THE INVENTION

The present invention relates to a high intensity internal mixer for the mixing and compounding of various heavy tough plastic masses, including but not limited to rubber, both natural and synthetic, vinyl and polyethylene plastics, linoleum and cellulose compounds.

Rotors or a series of paddles rotating in parallel intersecting cylindrical chambers of a mixer housing have commonly been employed in mixers of the prior art. In most instances the mixing elements of such devices are incapable of withstanding the high torsional and bending stresses to which they are necessarily subjected in the mixing and kneading of such heavy tough plastic masses. In other instances, they have been incapable of producing the necessary shear for effectively mixing and kneading such materials or have been inefficient due to the time required for mixing and kneading such materials thereby resulting in high operational costs.

SUMMARY OF THE INVENTION

As above described the rotors of the present invention are formed and arranged in their intersecting cylindrical housings to provide therewith a plurality of pockets varying in volume with respect to each other as they rotate 90° out of phase in the same direction and at the same speed, the oppositely twisted sections of each rotor having a displacement angle less than 90°. The major diameter extremities of the rotors, preferably provided with

2 an arcuate crest, being arranged to form with their cylindrical housing portions and with the adjacent flank of the mating rotor restricted clearances. The construction and relation of elements of the mixer is such as to provide the extremely high degree of shear necessary to break down the heavy tough plastic material into a homogeneous and thoroughly mixed mass. The necessary shear is obtained in this mixer in two ways; first by intense compression of the material trapped in a pocket of decreasing volume. The wiping action of the flank of one of the rotors on the material urges it in one direction, while the wiping action of the flank of the other rotor urges it in the opposite direction. In addition, the helix of the flanks of the rotors effect a generally longitudinal directional movement to the material. These three directionally induced flows plus the drag of the material on the wall of the surrounding chamber cause intense internal shear on the material. Second, as the pressure on the material in a pocket of decreasing volume increases, the material is forced to flow through the clearance between the crests of the rotors and the chamber wall, and between the crest of one rotor and the flank of the mating rotor in a sinuous generally longitudinal direction into a pocket of greater volume. As the material is forced through these clearances, it is subjected to high shear forces since the rotor crests are moving in relation to the chamber walls and in relation to the flank of the mating rotor. Increments of material are continuously being forced from one pocket into another pocket for integration and mixing therewith for effectively mixing the material into a homogeneous mass.

In an advantageous and preferred embodiment, where a greater degree of longitudinal intermixing of the material is desired, the oppositely twisted rotor sections of each rotor are displaced angularly with respect to each other to provide for direct longitudinal intercommunication between pockets of decreasing volume of a pair of interengaging rotor sections with pockets of greater volume of the other pair of interengaging rotor sections, so that increments of material are moved in a generally longitudinal direction back and forth between pockets of one pair of interengaging rotor sections and pockets of the other pair of interengaging rotor sections.

It is therefore an object of the invention to provide an improved and more efficient mixing and kneading apparatus, particularly for mixing and kneading of heavy tough plastic materials.

More specifically, an object is to attain a novel relationship of the rotating rotors with each other and with their enclosing chamber walls whereby they cooperate to produce a more effective shearing, mixing and kneading action on the material.

A further object is to provide in such mixers rotors that are simple to lay out and manufacture.

Other objects and advantages of the invention will be hereinafter pointed out or will become apparent from the following description when read in conjunction with the accompanying drawings.

BRIEF DESCRIPTION OF THE DRAWINGS

FIGURE 1 is a front elevational view of the apparatus;
FIGURE 2 is an end elevational view taken on line 2—2 of FIGURE 1 with parts broken away;

FIGURE 3 is a sectional view through the apparatus taken on line 3—3 of FIGURE 1;

FIGURE 4 is a sectional view taken on line 4—4 of FIGURE 3 with the rotors shown in plan;

FIGURE 5 is a view of the apparatus taken on line 5—5 of FIGURE 3;

FIGURE 7 is a diagrammatic view showing the profiles of a pair of cooperating interengaging rotor sections illustrating the manner in which the profiles are arrived at;

FIGURES 8A–13A diagrammatically show the outer ends of one of the rotor sections in different positions of rotation and FIGURES 8B–13B show the inner ends of the same rotor sections in similar different positions of rotation, revealing the change in size of the pockets formed between the rotors and their surrounding chamber walls;

Figure 6:
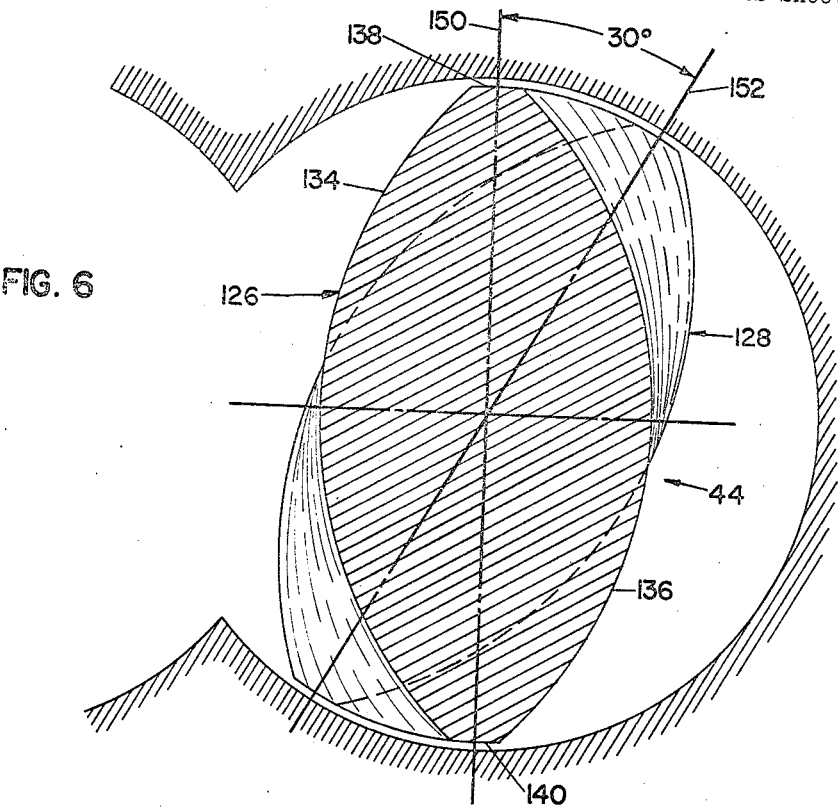
FIGURE 6 is a sectional view through one of the rotor chambers of the mixer and the rotor therein showing the helical twist of the rotor.

Referring to the drawings, the mixer includes a housing designated as a whole by the reference numeral 10, the interior being defined by walls which in cross section are in the form of side by side intersecting major arcs of equal radii providing communicating intersecting cylindrical chambers 12 and 14. In its preferred form, the housing 10 includes a pair of laterally spaced longitudinally extending castings 16 and 18 forming the sides and portions of the top and bottom of the housing 10, as best shown in FIGURE 3.

The top of the housing 10 is completed by a vertically movable ram 20 that in its lowered position, as shown in FIGURE 3 fits closely the space between the top portions of the laterally spaced castings 16 and 18. The bottom of the housing 10 is completed by a vertically swinging discharge door 22 that in its raised or closed position, as also shown in FIGURE 3, fits closely the space between the bottom portions of the laterally spaced castings 16 and 18.

When the ram is moved to its raised position, as shown in phantom in FIGURE 2, the space between the top portions of the laterally spaced castings 16 and 18 form a charging passage 24, FIGURE 3, for delivering the material to be mixed to the mixing chambers 12 and 14 of the housing 10; and when the discharge door 22 is swung downwardly, as shown in phantom in FIGURE 2, the space between the bottom portions of the laterally spaced castings 16 and 18 form a discharge passage 26, FIGURE 3, for discharge of the mixed materials from the mixing chambers 12 and 14 of the housing 10. As clearly shown in FIGURE 3, the inner walls of the castings 16 and 18, the ram 20 in closed position and the discharge door 22 in closed position, define the previously referred to communicating intersecting cylindrical chambers 12 and 14 of the mixer housing 10.

Plate members 28 and 30 are secured in suitable manner, as by bolts 32, to the ends of housing castings 16 and 18. Upper portions of the plate members 28 and 30 form end wall closures 34 and 36 for the cylindrical mixing chambers 12 and 14, as best shown in FIGURE 4; and the lower portions of the plate members 28 and 30 form standards 38 and 40 for supporting the housing 10 at a desired elevation above the floor.

A pair of cooperating rotors 42 and 44, the conformation and construction of which is hereinafter described in detail, are rotatively mounted coaxially within respective cylindrical mixing chambers 12 and 14. Shafts 46 and 48, preferably formed integral with rotors 42 and 44, extend axially from the ends thereof through the housing end wall closures 34 and 36 and packing ring bodies 50 and 52 of packing ring assemblies 54 and 56, the packing ring bodies 50 and 52 being welded or otherwise rigidly secured to the plate members 28 and 30. The packing ring bodies 50 and 52 are adapted to receive suitable packing rings (not shown) retained under adjustable pressure by means of packing glands 58 and 60, in any suitable conventional manner.

In a manner well known in the art, and therefore not shown, extensions of the shafts 46 and 48 at one of their ends are supported in suitable bearings and extensions at their other ends are driven from a motor through suitable gearing including reduction gearing and shaft couplings, the gearing being such as to rotate the shafts 46 and 48 and consequently the rotors 42 and 44 at the same speed and in the same direction, as indicated in the drawings by directional arrows.

Mounted on top of the mixer housing 10 is a charging stack, identified as a whole by the reference numeral 62, including side or end walls 64 and 66, a rear wall 68 that at its upper end is coterminous with the upper ends of side walls 64 and 66, and a front wall 70 that terminates at its upper end considerably short of the upper ends of side walls 64 and 66, and rear wall 68. The front wall 70 together with the lower portions of the side and rear walls 64, 66 and 68 form a charging passage 72 that in horizontal cross section is rectangular in configuration and registers with the charging passage 24 of the mixer housing 10. Forwardly projecting extensions 74 and 76 of upper portions of side walls 64 and 66 together with a door 78 hingedly mounted, as at 80, with the upper edge of the front wall 70 form, in the open position of the door 78 as in FIGURE 2, a chute for delivery of materials to the charging stack 62. Ribs 82 rigidly secured, as by welding, to the front wall 70 form a limit stop for holding the door 78 in its open position. A handle 84 movably attached to the door 78 is arranged to engage a latch plate 86 for retaining the door in its closed position, as best shown in phantom in FIGURE 2.

Secured in suitable manner to the upper ends of the side and end walls 64, 66 and 68 is a plate 88 on which is secured and supported an air cylinder 90 having a piston rod 92 which at its lower end is rigidly secured in suitable manner to the ram 20. The walls of the charging stack 62, as previously described, register with the mixer housing charging passage 24 thereby providing a guide for the ram 20 insuring entry thereof into the charging passage 24 into the position as best shown in FIGURE 3. Suitable means well known in the art, and therefore not shown, is provided for introducing and controlling admission of air to one end or the other of the cylinder 90 for selectively raising the ram 20 to its broken line position, as shown in FIGURE 2, to permit charging of material into the stack 62; and for lowering the ram 20 to its full line position, as shown in FIGURE 3, to force the material to be mixed into the mixing chambers 12 and 14, and in which position the ram forms wall portions of the cylindrical mixing chambers 12 and 14.

The discharge door 22 is mounted on a door support plate 94 adjacent one end thereof, the plate 94 being disposed below the mixer housing 10, as best shown in FIGURE 3. The opposite end of the support plate 94 is mounted at the lower front side of the mixer housing for vertical swinging movement about a horizontal longitudinally extending axis for swinging the door 22 to its full line closed position, as shown in FIGURES 1, 2 and 3; and to its phantom line open position, as shown in FIGURE 2. For this purpose the lower front side of mixer housing casting 18 is provided intermediate its ends with a recess 96 adapted to receive an upstanding boss 98 on the upper front end of the support plate 94.

A hinge pin 100 extends longitudinally through the lower front side of the casting 18 and boss 98 of the support plate 94 for swingably supporting the latter from the mixer housing 10.

The discharge door 22 is provided with a centrally disposed depending lug 102 adapted to extend through an enlarged opening 104 in the door support plate 94. A horizontal longitudinally extending hinge pin 106 extends through the support plate 94 and depending lug 102 whereby the door 22 is supported on the support plate 94 for pivotal movement about a horizontal longitudinally extending axis. Set screws 108, four in number being shown in FIGURE 5, are threaded through the support plate 94 from the bottom side thereof and are arranged to engage the bottom of the door 22 at opposite sides of the hinge pin 106. By proper adjustment of the set screws 108, the door can be adjusted to provide for a tight fit between the beveled edges 110 of the confronting ends of the lower portions of the housing castings 16 and 18 defining the discharge passage 26 and the beveled side edges 111 of the door casting 22.

A lever 112 is provided for swinging the door 22 between open and closed position and latch means cooperating with the lever 112 is provided for locking the door 22 in closed position. The lever 112 is pivotally mounted between its ends to the under side of the door support plate 94 for swinging movement about an axis normal to the under surface of the door support plate 94 on a shoulder bolt 114 extending through the lever 112 and threaded into the support plate 94 subjacent the previously described pivotal mounting of the support plate 94. The forwardly extending lever arm 116 of the lever 112 forms a handle for manually swinging the lever 112. The rearwardly extending lever arm 118 of the lever 112 projects beyond the rearward end of the support plate 94 and is arranged to engage a latch plate 120, secured to the underside of the mixer housing casing 16, for locking the door 22 in its closed position when the lever 112 is swung to its full line position as shown in FIGURE 5 and is arranged to disengage the latch plate 120, as shown in phantom in FIGURE 5, to permit downward swinging of the door 22 to its open position. The free end portion of the lever arm 118 projects through and is arranged to be supported in an inverted U-shaped guide bracket 122 secured to the under side of the door support plate 94 subjacent its rearward end. In order to minimize the frictional contact area between the under surface of the door support plate 94 and the top surface of the lever arm 118 as it is swung between latched and unlatched positions, a suitable number of pads 124 are secured, as by welding to the under side of the door support plate 94.

The rotors 42 and 44 are identical in construction and in describing the specific construction of one of the rotors, it will be understood that this applies in similar manner to the other of the rotors. The integrally formed rotor 44, as best shown in FIGURE 4, includes two axially joined rotor sections 126 and 128 of equal length and similarly rotor 42 includes two axially joined rotor sections 130 and 132 of equal length. Referring to FIGURES 3, 4 and 6 and particularly to FIGURE 6, rotor 44 in any cross section normal to the axis thereof is lenticular in shape having convex flanks 134 and 136, the radially outer ends of which are joined by arcuate crests 138 and 140. In similar manner, rotor 42 is formed with similar convex flanks, and similar arcuate crests.

The rotors 42 and 44 are twisted on a helix and referring particularly to FIGURE 4 it will be seen that rotor section 126 of rotor 44 twists from its end adjacent end wall 34 to its juncture with rotor section 128 in a direction backwardly away from the direction of rotation of the rotor 44, then without interruption the rotor section 128 twists in the opposite direction from its juncture with rotor section 126 to its end adjacent the end wall 36. The rotor sections 130 and 132 of rotor 42 are twisted in the same manner respectively as are the rotor sections 126 and 128 of rotor 44. The rotor sections 126 and 130 are thus twisted in the same direction with respect to each other, as also are the rotor sections 128 and 132, with the twist of rotor sections 126 and 130 being of opposite hand with respect to rotor sections 128 and 132. The direction of twist of the rotor sections 126 and 130 relative to the direction of rotation of the rotors 44 and 42 and the direction of twist of the rotor sections 128 and 132 relative to the direction of rotation of the rotors 44 and 42 urges the material being mixed in a direction away from the end walls 34 and 36 of the chambers 12 and 14 as indicated by the arrows in FIGURE 4.

Referring particularly to FIGURES 4 and 6, the displacement angle between the major axis 150 of the rotor section 128 at its juncture with rotor section 126 and the major axis 152 of the rotor section 128 at its end adjacent the mixer housing end wall 36 is less than 45° and greater than 0°, a preferred displacement angle of 30° being shown. In like manner the rotor sections 126, 130 and 132 are provided with a similar displacement angle. While retaining the same selected displacement angle, the axial extent of the rotors 42 and 44 and consequently the axial extent of the mixing chambers 12 and 14 can be varied since this requires merely a change in the angle of twist of the helix of the rotors.

Figure 7:
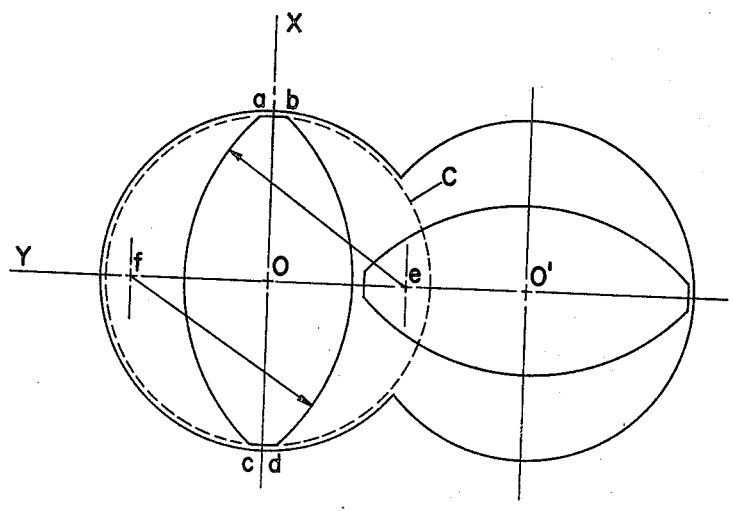
Figure 16:
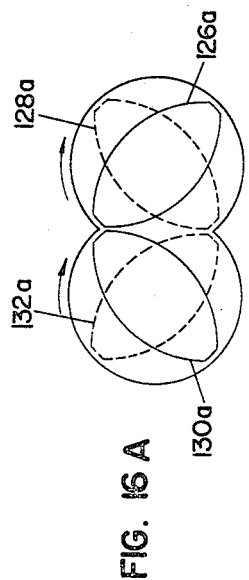
FIGURES 16A–16D are diagrammatic views showing the relation of the adjacent ends of the rotor sections in different positions of rotation.
Figure 16:
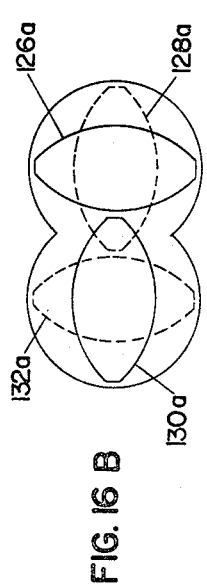
Figure 16:
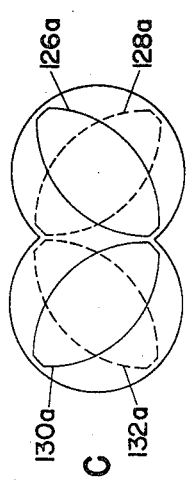
Figure 16:
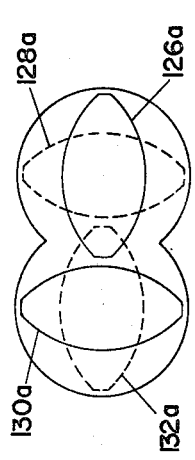
Figure 14:
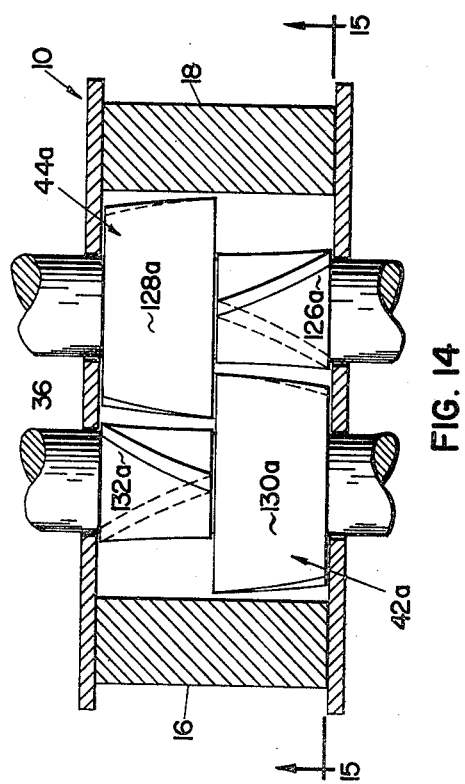
FIGURE 14 is a view of the mixer similar to FIGURE 4 showing a modified form of the rotors, in which the longitudinally adjacent rotor sections of each of the rotors are angularly displaced with respect to each other.
Figure 15:
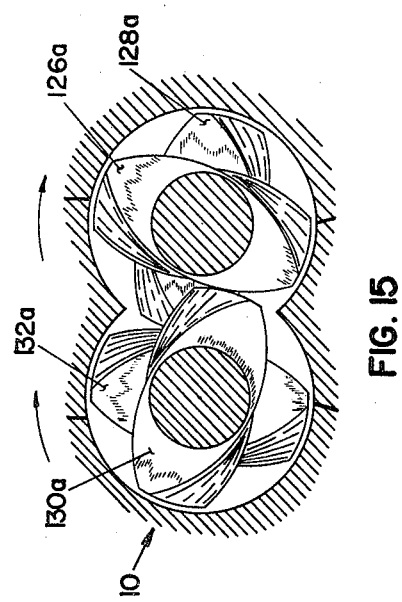
FIGURE 15 is a sectional view taken on line 15—15 of FIGURE 14.

The cross sectional configuration of the rotors 42 and 44 and relation one to the other is such that when rotated at the same speed and in the same direction they will interengage, with each of the crests of one rotor following respective flank of the other rotor with a desired clearance therebetween. Referring to FIGURE 7, the cross sectional configuration and relation of the rotors is arrived at in the following manner. Let the broken line circle C represent the peripheral envelope of one of the rotors, the diameter of which is selected to equal the desired major axis of the rotor. On the circle C lay out the diametrically opposite desired equal crests $ab$ and $cd$ of the rotor, bisected by the ordinate X, such crests being less than half the major axis of the rotor. From a point $e$ on abscissa Y offset from the center O of circle C a distance equal to one-half the major diameter of the rotor less the width of the crest described an arc connecting points $a$ and $c$, the said arc $ac$ defining one flank of the rotor. From a point $f$ on abscissa Y equal to O$e$ describe an arc connecting points $b$ and $d$, the said arc $bd$ defining the opposite flank of the rotor. The second rotor is layed out in similar manner but is disposed with its major diameter at right angles with respect to the first rotor, with centers O, O′ spaced apart a distance on abscissa Y equal to one-half the sum of the major and minor diameters of a rotor plus the minimum clearance desired between the crest of one rotor and the flank of the other rotor. The walls of the chambers 12 and 14 housing the rotors are defined by intersecting arcs described from points O and O′, the radii of which are equal to one-half the major diameters of the rotors plus a desired clearance between the rotor crests and the walls of the chambers.

As previously described, the rotor sections 126 and 128 of rotor 44 have the same cross sectional configuration with the direction of twist being of opposite hand, and similarly the rotor sections 130 and 132 of rotor 42 have the same cross sectional configuration with the direction of twist being of opposite hand. FIGURES 8A and 8B diagrammatically illustrate, respectively, the relative positions of the opposite ends of rotor sections 130 and 126 in one phase of their rotation, with FIGURE 8A representing the outer end faces of rotor sections 130 and 126 adjacent end wall 34 and FIGURE 8B representing the inner end faces of rotor sections 130 and 126 at their juncture with the rotor sections 132 and 128. FIGURES 9A and 9B, 10A and 10B, 11A and 11B, 12A and 12B, and 13A and 13B show the rotor sections 130 and 126 at progressive 30° of rotation.

It will be seen that in position 8A, 8B, the outer end of pocket A has its maximum area while the inner end of pocket A has a smaller area.

Rotated through 30° from position 8A, 8B to position 9A, 9B—Result

Outer end of pocket A gets progressively smaller
Inner end of pocket A gets progressively larger
Material in pocket A moves from the outer toward the inner end of pocket A
Outer end of pocket B gets progressively larger
Inner end of pocket B remains the same
Outer end of pocket C remains the same
Inner end of pocket C gets progressively smaller
Material is squeezed through the clearance between crest of rotor section 130 and the mixing chamber wall from pocket C of decreasing volume into pocket B of increasing volume in a sinuous path from the inner to the outer end of pocket B.

Rotated through 30° from position 9A, 9B to position 10A, 10B—Result

Outer end of pocket A gets progressively smaller
Inner end of pocket A gets progressively smaller
Outer end of pocket B gets progressively larger
Inner end of pocket B gets progressively larger
Outer and inner ends of pocket C remain at their minimum area
Material is squeezed through the clearance between one crest of rotor section 130 and the adjacent flank of rotor section 126 from pocket A of decreasing volume into pocket B of increasing volume in a sinuous path from the inner to the outer end of pocket B, and also through the clearance between the opposite crest of rotor section 130 and the mixing chamber wall from pocket A into pocket B in a sinuous path from the outer to the inner end of pocket B.

Rotated through 30° from position 10A, 10B to position 11A, 11B—Result

Outer end of pocket A progressively decreases to its minimum area.
Inner end of pocket A gets progressively smaller.
Outer end of pocket B progressively increases to its maximum area.
Inner end of pocket B gets progressively larger.
Outer and inner ends of pocket C remain at their minimum area.
Further material is squeezed through the clearances in the same manner as described above in the immediately preceding positions of the rotor sections.

Rotated through 30° from position 11A, 11B to position 12A, 12B—Result

Outer end of pocket A remains at its minimum area.
Inner end of pocket A progressively decreases to its minimum area.
Outer end of pocket C gets progressively larger.
Inner end of pocket C remains at its minimum area.
Material is squeezed through the clearance between the the crest of rotor section 130 and the mixing chamber wall from pocket A of decreasing volume into pocket C of increasing volume in a sinuous path from the inner to the outer end of pocket C.
Outer end of pocket B gets progressively smaller.
Inner end of pocket B progressively increases to its maximum area.
There being no change in the volume of pocket B, material merely moves from the outer toward the inner end of pocket B.

Rotated through 30° from position 12A, 12B to position 13A, 13B—Result

Outer and inner ends of pocket A remain at their minimum area.
Outer end of pocket B gets progressively smaller.
Inner end of pocket B gets progressively smaller.
Outer end of pocket C gets progressively larger.
Inner end of pocket C gets progressively larger.

Material is squeezed through the clearance between one crest of rotor section 126 and the adjacent flank of rotor section 130 from pocket B of decreasing volume into pocket C of increasing volume in a sinuous path from the inner to the outer end of pocket C, and also through the clearance between the opposite crest of rotor section 126 and the mixing chamber wall from pocket B into pocket C in a sinuous path from the outer to the inner end of pocket C.

Rotated through 30° from position 13A, 13B to position 8A, 8B—Result

Outer and inner ends of pocket A remain at their minimum area.
Outer end of pocket B gets progressively smaller.
Inner end of pocket B gets progressively smaller.
Outer end of pocket C gets progressively larger.
Inner end of pocket C gets progressively larger.
Further material is squeezed through the clearances in the same manner as described above in the immediately preceding position of the rotor sections.

The rotors have now turned through 180° and a similar sequence of events follows as they are turned through the next 180°.

The sequence of events has been illustrated and described above with reference to the rotor sections 126 and 130, however it will be understood that the same sequence of events occurs between the rotor sections 128 and 132 which, as described above, are identical with rotor sections 126 and 130 but have a helical twist of opposite hand so that the directionally induced flow of material is in the opposite direction.

The construction and cooperation of elements as described above provide a high intensity internal mixer for the mixing and compounding of various heavy plastic masses, including, but not limited to, rubber, both natural and synthetic, vinyl and polyethylene plastics, linoleum and cellulose compounds.

When mixing this type material extremely high shear is necessary to break down the feed material into a homogeneous mass and to disperse completely the various additives that are to be mixed with it. The necessary shear is obtained in this mixer in two ways; first, by intense compression of the materials undergoing mixing when it is trapped in a pocket of decreasing volume. As the material is forced into the decreasing volume, caused by the rotation of the rotor as described above, the wiping action of the flank of one of the rotors on the material urges it in one direction, while the wiping action of the flank of the other rotor on the material urges it in the opposite direction. Referring for example to FIGURES 9A, 9B and 10A, 10B, in which as above described pocket A is compression pocket, the wiping action of the flank of rotor 130 moves material in pocket A in the direction of arrow 154 while the wiping action of the flank of rotor 126 moves material in pocket A in the direction of arrow 156. In addition the helix of the flanks of the rotors effect a generally longitudinal directional movement to the material. These three directionally induced flows plus the drag of the material on the wall of the surrounding chamber cause intense internal shear on the material. Second, as the pressure in the compression pockets increases, the material is forced to flow through the clearance between the crests of the rotors and the chamber wall, and between the crest of one rotor and the flank of the mating rotor in a sinuous path, as previously described, into an expansion pocket. As the material is forced through these clearances, it is subjected to high shear forces since the rotor crests are moving in relation to the chamber walls and in relation to the flanks of the mating rotor.

In a typical installation found to give excellent results, rotors having a major diameter of approximately 5 inches and crests of approximately 7/16 of an inch were employed, from which the flanks of the rotors were determined in the manner described above. The center distances of the rotors were determined in the manner also described above to provide a clearance of approximately 3/16 of an inch between the crest of a rotor and the adjacent flank of a mating rotor at their closest approach to each other. The radius of the intersecting cylindrical chamber walls were selected to provide between the chamber walls and the rotor crests a clearance of approximately 1/16 of an inch. For larger diameter rotors such clearances may advantageously be increased though not necessarily proportionately.

A modification of the rotor design is shown in FIGURES 14 through 16A, B, C and D. The housing and the elements thereof enclosing the modified rotors are identical with the first form of the invention and are identified by the same reference characters. The rotors and the rotor sections are identified for convenience by the same reference characters as in the first form of the invention with the suffix $a$. The rotors 42$a$ and 44$a$ corresponding to rotors 42 and 44 of the first form of the invention are formed respectively with rotor sections 130$a$, 132$a$ and 126$a$, 128$a$; however, unlike the first form of the invention, the rotor sections 130$a$ and 132$a$ are angularly displaced with respect to each other as are the rotor sections 126$a$ and 128$a$, preferably at an angle of 90°.

In diagrammatic FIGURES 16A, B, C and D, the inner ends of the rotor sections 130$a$ and 126$a$ are depicted by full lines, while the inner adjacent ends of the rotor sections 132$a$ and 128$a$ are depicted by broken lines, in progressive positions of rotation. As in the first form of the invention, the interengaging rotor sections 130$a$ and 126$a$ form with the walls of the housing a plurality of pockets, the volumes of which change with respect to each other as the rotors rotate in the same direction and at the same speed. Similarly, the interengaging rotor sections 132$a$ and 128$a$ form with the walls of the housing a plurality of pockets, the volumes of which change with respect to each other as the rotors rotate. These pockets have been fully described in connection with the first form of the invention and are therefore clearly identifiable in FIGURES 16A, B, C and D.

Unlike the first form of the invention, in which compression, expansion and unchanging volume pockets of rotor sections 130, 126 are in endwise registration with similar compression, expansion and unchanging volume pockets of rotor sections 132, 128, in the modified form of the invention, each pocket of rotor sections 130$a$, 126$a$ is in endwise communication with at least two pockets of rotor sections 132$a$, 128$a$ so as to provide endwise intercommunication between pockets of decreasing volume of a pair of interengaging rotor sections with pockets of greater volume of the other pair of interengaging rotor sections, so that increments of material are moved in a generally longitudinal direction back and forth between pockets of one pair of interengaging rotor sections and pockets of the other pair of interengaging rotor sections, in addition to the squeezing of materials from a pocket of decreasing volume into a pocket of increasing volume through the restricted clearances between the rotor crests and the housing walls and the restricted clearances between the crest of a rotor and the adjacent flank of the mating rotor, whereby more effective longitudinal intermixing of the material is effected.

I claim:

1. A mixer comprising a housing in the form of parallel intersecting cylinders, a pair of similar radially interengaging rotors mounted to rotate 90° out of phase and about axes extending axially of said cylinders, means for rotating said rotors in the same direction and at the same speed, each of said rotors being lenticular in cross section and having convex flanks joined at the major axis extremities of said rotors by arcuate crests, said convex flanks each being formed as a circular arc described from a point on the extended minor diameter of its rotor offset from the axis thereof a distance equal to one-half the major diameter of the rotor less the width of a said crest.

2. A mixer in accordance with claim 1 wherein said rotors are twisted on a helix having a displacement angle less than 90°.

3. A mixer in accordance with claim 1 wherein the major diameter of each of said rotors is significantly smaller than the diameter of its respective housing to provide between the crests of each of said rotors and its respective housing a restricted clearance and wherein the center distance between the axes of said rotors is significantly greater than one-half the sum of the major and minor diameters of a rotor to provide between the crest of one rotor and the adjacent flank of the other rotor a restricted clearance, whereby material is squeezed through said restricted clearances as said rotors rotate.

4. A mixer in accordance with claim 1 wherein said rotors are twisted on a helix having a displacement angle less than 90°, wherein the major diameter of each of said rotors is significantly smaller than the diameter of its respective housing to provide between the crests of each of said rotors and its respective housing a restricted clearance, and wherein the center distance between the axes of said rotors is significantly greater than one-half the sum of the major and minor diameters of a rotor to provide between the crest of one rotor and the adjacent flank of the other rotor a restricted clearance, whereby material is squeezed through said restricted clearances as said rotors rotate.

5. A mixer comprising a housing in the form of parallel intersecting cylinders, a pair of similar radially interengaging rotors mounted to rotate 90° out of phase and about axes extending axially of said cylinders, each of said rotors being lenticular in cross section, means for rotating said rotors in the same direction and at the same speed, said rotors being twisted on a helix extending from one end of said rotors to the midpoint thereof and having a displacement angle less than 90°, and being twisted on a helix of opposite hand extending from said midpoint of said rotors to the opposite end thereof and having a displacement angle less than 90°, the major diameter of said rotors being significantly smaller than the diameter of their respective housings to provide between the major diameter extremities of the rotors and their respective housings a restricted clearance, the center distance between the axes of said rotors being significantly greater than one-half the sum of the major and minor diameters of a rotor to provide between the major diameter extremity of one rotor and the adjacent flank of the other rotor a restricted clearance, said rotors forming with said casing a plurality of pockets with at least one pocket varying in volume with respect to at least one other pocket during rotation of said rotors whereby when said housing is substantially filled with material, material is forced from one to the other of said pockets.

6. A mixer in accordance with claim 5 wherein said housing is provided with end walls forming closures for the ends of said pockets.

7. A mixer in accordance with claim 5 wherein said rotors are twisted from their ends to their midpoints in a direction opposite the direction of rotation of said rotors.

8. A mixer in accordance with claim 5 wherein the oppositely twisted portions of said rotors at their said midpoints are angularly displaced.

11

9. A mixer in accordance with claim 5 wherein the oppositely twisted portions of said rotors at their said midpoints are angularly displaced and wherein said housing is provided with end walls forming closures for the ends of said pockets.

10. A mixer in accordance with claim 5 wherein the the oppositely twisted portions of said rotors at their said midpoints are angularly displaced approximately 90° and wherein said housing is provided with end walls forming closures for the ends of said pockets

12

References Cited

UNITED STATES PATENTS

| | | | |
|---|---|---|---|
| 2,495,241 | 1/1950 | Eaby | 259—6 |
| 2,559,418 | 7/1951 | Ford | 259—104 |
| 3,198,491 | 8/1965 | Loomans | 259—6 |

ROBERT W. JENKINS, Primary Examiner

U.S. Cl. X.R.

259—6